United States Patent

Lessmann et al.

[11] 3,924,092
[45] Dec. 2, 1975

[54] METHOD AND APPARATUS FOR CLADDING A BASE METAL

[75] Inventors: Gerald G. Lessmann, Pittsburgh; Albert R. Vaia, Delmont, both of Pa.

[73] Assignee: Westinghouse Electric Corporation, Pittsburgh, Pa.

[22] Filed: June 14, 1974

[21] Appl. No.: 479,388

[52] U.S. Cl. .............................. 219/76; 219/123
[51] Int. Cl.² .................................... B23K 9/04
[58] Field of Search .................. 219/76, 123

[56] References Cited
UNITED STATES PATENTS

| | | | |
|---|---|---|---|
| 1,787,600 | 1/1931 | Strobel | 219/123 |
| 2,277,654 | 3/1942 | Merlub-Sobel et al. | 219/76 X |
| 2,813,190 | 11/1957 | Felmley | 219/76 |
| 2,841,687 | 7/1958 | Richter | 219/76 |
| 3,369,067 | 2/1968 | De Corso | 219/123 X |
| 3,538,297 | 11/1970 | Maniero et al. | 219/123 X |
| 3,573,420 | 4/1971 | Johnson | 219/76 |
| 3,673,374 | 6/1972 | Hauck | 219/76 |
| 3,777,115 | 12/1973 | Kazlauskas et al. | 219/76 X |

*Primary Examiner*—J. V. Truhe
*Assistant Examiner*—N. D. Herkamp
*Attorney, Agent, or Firm*—F. J. Baehr, Jr.

[57] ABSTRACT

A water cooled non-consumable electrode having a field winding associated therewith is utilized to produce an arc, which plays over the tip and produces an enlarged molten pool into which a ribbon or multiple wires of cladding metal are feed under an inert gas blanket. The electrode generally moves over the base metal to produce uniform overlapping bands of cladding metal, which overlays the base metal and is integrally bonded thereto.

4 Claims, 4 Drawing Figures

METHOD AND APPARATUS FOR CLADDING A BASE METAL

BACKGROUND OF THE INVENTION

1. Field of the Invention

This invention relates to cladding and more particularly to a method and apparatus for cladding a base metal with overlapping bands of cladding material utilizing an electric arc to weld the cladding metal to the base metal.

2. Description of the Prior Art

Weld overlays or cladding have been utilized for many years to obtain special surface characteristics such as corrosion or wear resistance not provided by a satisfactory economic structural material.

To optimize the cladding process, it is necessary to produce deposits of cladding material in which there is low dilution or mixing of the base and cladding metal and to deposit the cladding metal at a high rate. The cladding should also be of the proper thickness dictated by the functional requirement, rather than by the process utilized to deposit the cladding metal.

As large areas are usually involved, manual welding is not satisfactory as the labor requirements make such cladding prohibitively expensive, therefore some type of automatic welding technique is required.

A conventional cladding technique is the submerged arc welding process, in which the arc is produced by a consumable continuous wire electrode, which is fed at a controlled rate into a molten pool formed by the arc. To protect the molten pool from corrosion the arc zone is protected by a layer of granular flux. To increase the deposition rate multiple electrodes are utilized. Inherent disadvantages of this technique are the high base metal penetration requiring thick cladding to guarantee acceptable dilution levels.

Another conventional cladding technique is the plasma arc hot wire surfacing process, in which filler wire is resistantly heated and feed through a nozzle to intersect in the weld puddle beneath the plasma arc. The plasma arc is employed to melt the top surface of the substrata and supply sufficient heat to the wire to completely fuse the cladding metal to the substrate or base metal with a minimum amount of dilution. A helium argon gas mixture is utilized to support the transferred arc and provide a shield for the molten pool. The plasma arc hot wire surfacing process inherently requires low surface speeds, because of the constricted area of the arc, it results in high maintenance costs, because of the complexity of the plasma torch, and also it requires very accurately maintained process parameters to maintain the arc.

SUMMARY OF THE INVENTION

Among the objects of this invention is the provision of a cladding apparatus and process, which utilizes a simple independently controlled high power input heat source, which will allow high welding speeds; the provision of a cladding apparatus and process, which will produce low dilution and allow the use of a minimal cladding thickness.

In general, a method and apparatus for cladding a base metal, when made in accordance with this invention, utilizes an electrode having a non-consumable tip, magnetic field producing means cooperatively associated with the tip and a gap between the tip and the base metal to produce an arc, which forms a molten surface on the base metal. A suitable gas is utilized to shield the arc and molten surface. Cladding metal is introduced into the vicinity of the arc and molten surface, and a magnetic field is utilized to produce relative motion between the tip and the arc. Finally the electrode is moved relative to the base metal in such a manner to produce overlapping uniform bands of cladding material overlaying and integrally bonded to the base metal.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
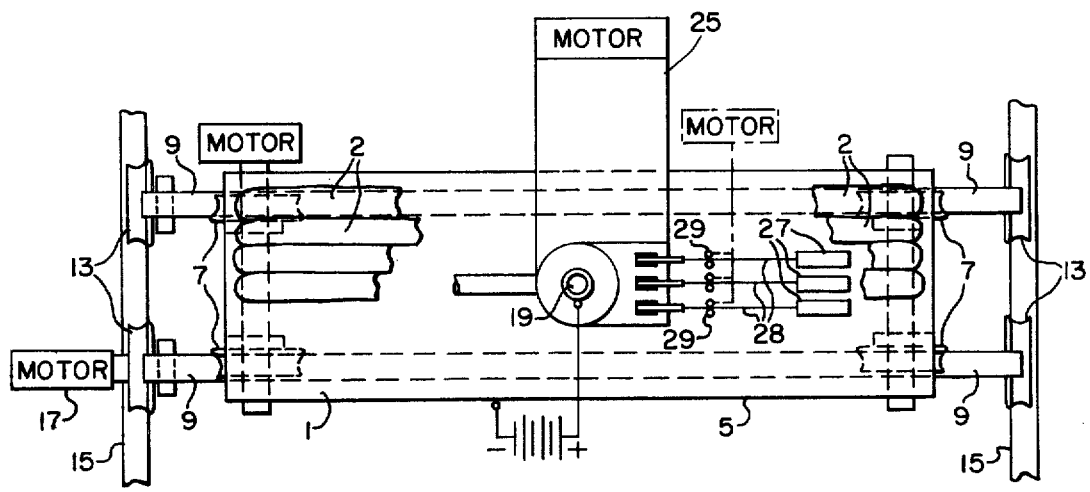
FIG. 1 is a schematic diagram of apparatus utilized to clad a flat sheet of base metal.

Referring now to the drawings in detail and particularly to FIG. 1, there is shown an apparatus for cladding a base metal 1 with overlapping uniform bands 2 of cladding material overlaying and integrally bonded to a plate of base metal 1. The cladding apparatus comprises a movable carriage 5 to which the base metal or plate 1 is attached. The carriage 5 is disposed on rollers 7 which engage longitudinal rails 9, a drive motor 11 or other means is utilized to automatically move the carriage rectilinearly in a longitudinal direction along the rails 9.

The longitudinal rails 9 are disposed on rollers 13 which engage transverse rails 15. A drive motor 17 or other means is utilized to automatically move the carriage an incremental distance rectilinearly in the transverse direction along rails 15.

Figure 2:
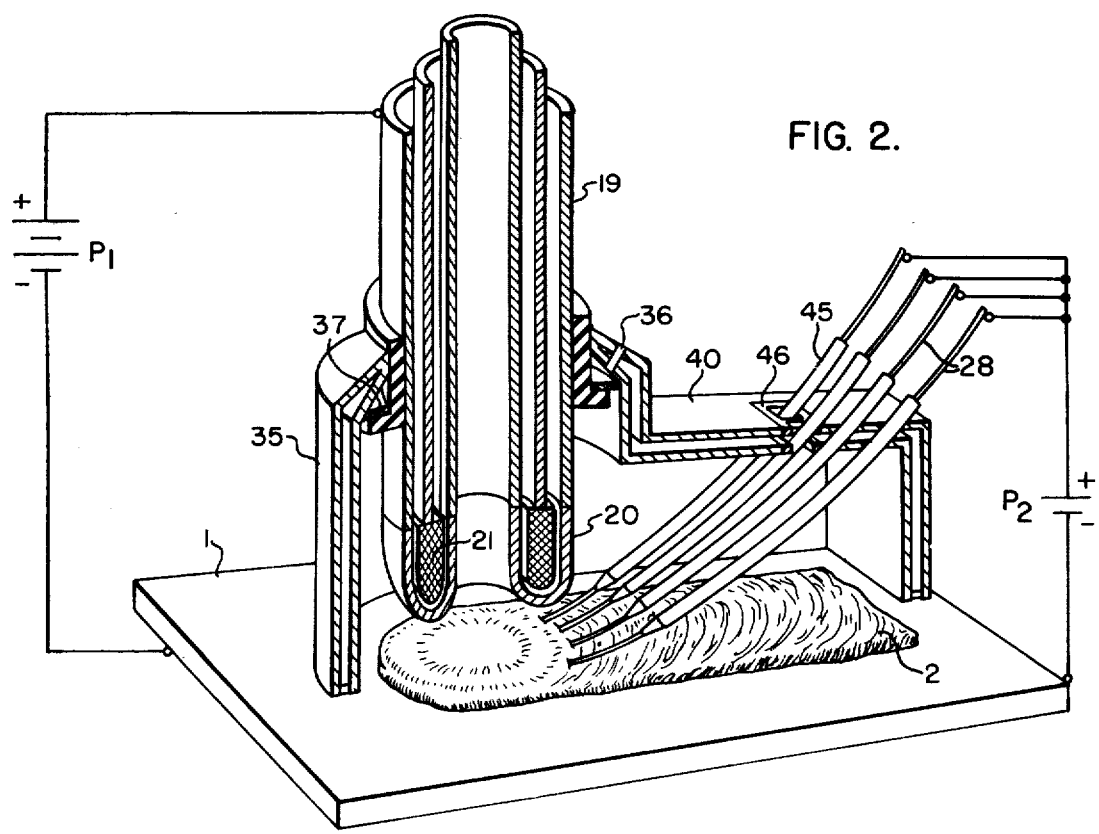
FIG. 2 is a schematic diagram of an arrangement utilized in the cladding process.

As shown in FIG. 2, an electrode 19 is disposed above the carriage 5 and generally perpendicular to the base metal plate 1 disposed thereon. The electrode 19 is water cooled and has a nonconsumable replaceable tip 20. The electrode is spaced above the base plate so as to form a gap and electrical power is supplied to the electrode by a power source $P_1$ in order to form an arc between the tip of the electrode 19 and the base plate 1.

A field coil winding 21 is disposed within the electrode in heat transfer relationship with the cooling water. The field coil winding 21 provides means within the electrode for producing a magnetic field, which causes the arc to move with respect to the tip 20 of the electrode 19 to prevent degradation of the tip and to spread the area over which the arc plays over the plate 1.

For a more complete description of the electrode and its construction reference may be made to U.S. Pat. No. 3,781,449 by Charles DeWolf and Ronald R. Akers entitled "Non-Consumable Electrode For An Electric Arc Furnace With Integral Cooling And Electrically Conducting Means" issued Dec. 25, 1973 which patent is hereby incorporated by reference in this specification.

As shown in FIG. 1 the electrode is attached to a column 25, which contains means for moving the electrode up or down to adjust the gap between the tip of the electrode and the base metal. The means for moving the electrode may be automatically adjusted to vertically position the electrode to maintain a generally constant voltage between the tip of the electrode and the base metal.

Cladding strip reels 27 are disposed above the carriage 5 and are pivotally mounted and adapted to hold reels of strip cladding metal 28. The strips 28 may be in the form of wire and have a generally round cross-section, or they may be in the form of a ribbon having a generally rectangular crosssection. Strips from the reels 27 are threaded over a feed wheel 29, which is driven by a motor 31, which automatically feeds the strips at a control rate to the vicinity of the arc.

The strips 28 may be connected to a power source $P_z$, which heats the strips 28 by resistance heating or by other means as the strips 28 are being fed toward the base metal in the vicinity of the arc. The resistance heating cooperates with the arc to melt the cladding strip to produce a molten surface or shallow pool overlaying the base metal and integrally bonded thereto.

Figure 3:
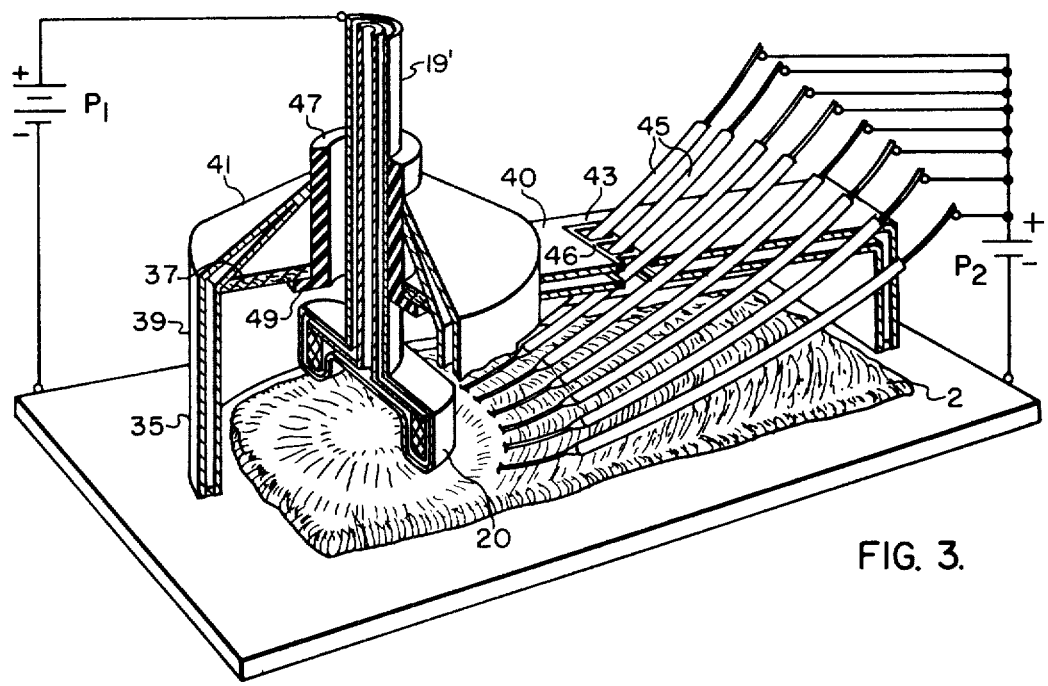
FIG. 3 is a schematic diagram of an alternate arrangement.
Figure 4:
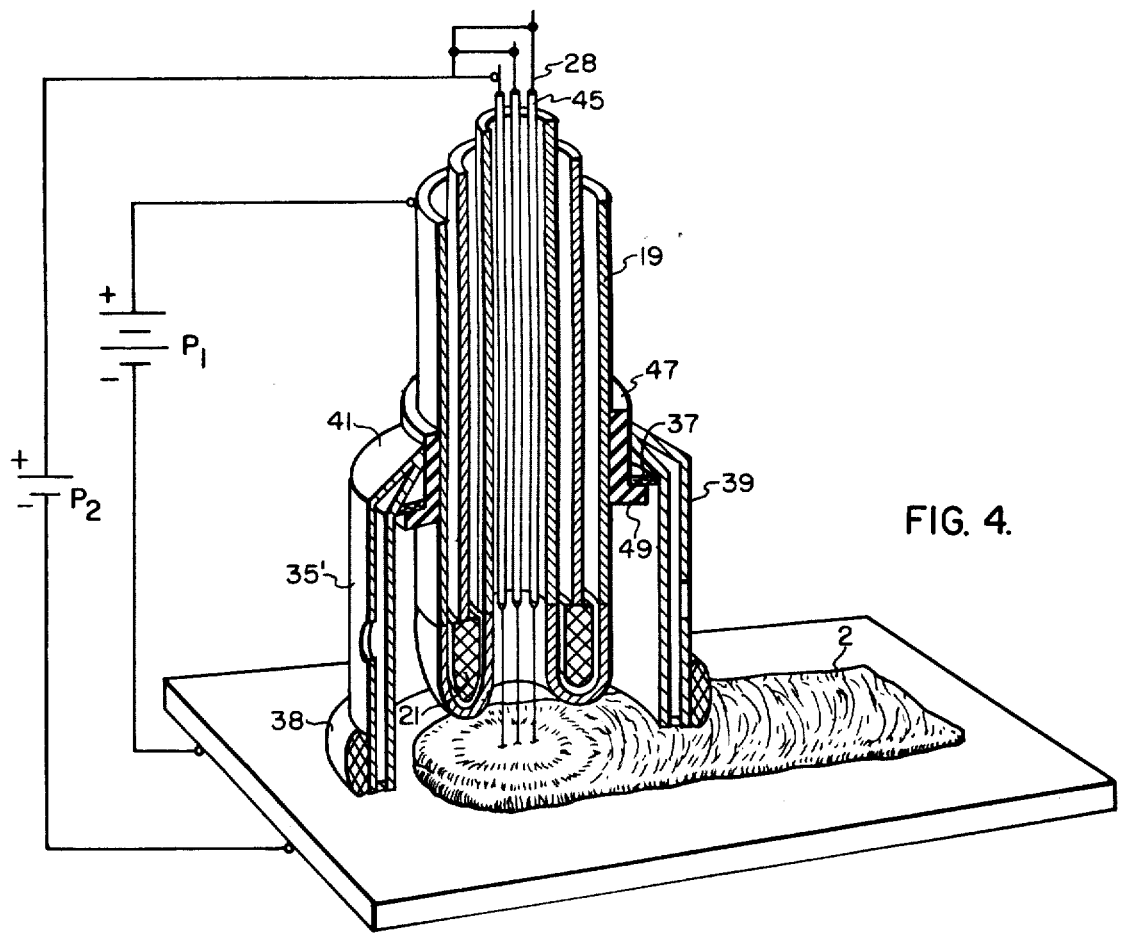
FIG. 4 is a schematic diagram of another alternate arrangement.

As shown in FIGS. 2, 3 and 4 the tip 20 of the electrode 19 is subtended or generally enclosed by a water cooled double wall gas shield, jacket or hood 35. Inert or other suitable gas such as a mixture of argon and carbon dioxide is supplied to the inside of the hood 35 through a opening 36 in the hood 35. A diffuser 37 is disposed within the hood 35 to produce a laminar flow of the blanketing gas. The hood 35 generally confines the blanket gas to the vicinity of the arc and molten pool formed on the surface of the base metal in order to protect the molten cladding material from contamination from the air.

As shown in FIG. 2, the tip 20 of the electrode 19 may have a generally round cross-section and the cladding strip 28 may be fed at such an angle as to generally form an acute angle with respect to the base metal.

As shown in FIG. 3 the tip 20' of the electrode 19' may have a generally rectangular shape cross-section in order to produce a wider band of cladding metal. The number and shape of the strips 28 of cladding material may be varied to provide the proper quantity of cladding metal.

FIG. 4 shows strips 28 being fed generally perpendicular to the base metal and through the central opening of the electrode 19 and a field coil 38 subtending or surrounding the hood 35', the field coil 38 is energized to produce a magnetic field, which cooperates or interacts with the magnetic field produced by the coil 23 within the electrode 19 to produce a uniform band of cladding material.

The hood 35 or 35' comprises a double wall structure in which cooling water is circulated between the walls. The hood 35 or 35' generally has walls enclosing all sides except the side adjacent the base metal. The hood 35 is made up of a cylindrical portion 39 which subtends or surrounds the electrode 19 and a rectangular portion 40 extending from the cylindrical portion 39. On top of the cylindrical portion 39 is a frusto-conical portion 41. The top of the rectangular portion 39 has an opening 43 adapted to receive guides 45 through which the strips of cladding metal are fed. Insulators 46 are disposed between the guides 45 and the rectangular portion.

An insulating cylindrical sleeve member 47 slips over and frictionally engage the electrode in a sealing relationship therewith. A flange 49 extends radially from the lower end of the sleeve member 47 and the diffuser 37 is formed into an annular ring which rests on the flange 49 and engages the hood 35 forming a barrier through which the influent blanketing must pass. The sleeve 47 prevents inert gas from leaking from the top portion of the hood.

The process for cladding a base metal 1 with overlapping uniform bands 2 or cladding metal overlaying and integrally bonded to a base metal utilizing a water cooled electrode having a non-consumable tip and a field coil winding associated therewith to produce a magnetic field to provide a high power distribution heat source such a process comprises the following steps:

Producing a gap between the tip of the electrode and the base metal, the gap being varied to maintain a generally constant voltage between the tip 20 and the base metal 1;

Producing an electrical arc between the tip 20 and the base metal 1 by supplying electrical power to the electrode 19 in order to form a shallow molten pool or molten surface in the zone or vicinity of the arc;

Shielding the arc and molten surface from atmospheric contaminates by flooding the area or vicinity of the arc and molten pool with an inert or other suitable gas;

Introducing cladding metal in the vicinity or zone of the arc and molten surface at a controlled rate, the cladding metal may be introduced in the form of a continuous wire, a continuous ribbon, a continuous strip 28, powder or some other form;

Heating the cladding metal prior to its being introduced in the vicinity of the arc and molten surface by resistance heating or other means;

Energizing the coil 21 associated with the electrode 19 to produce a magnetic field which causes relative movement between the tip 20 and the arc in order to enlarge the area of the molten surface and prevent degradation of the tip 20 as the arc plays thereupon;

Relatively moving the electrode 19 with respect to the base metal 1 in such a manner as to produce generally uniform overlapping bands 2 of cladding metal overlaying and integrally bonded to the base metal 1 by moving the carriage 5 rectilinearly along the rails 9 at a predetermined rate and incrementally moving the carriage 5 generally perpendicular to the bands 2; and Energizing a coil 38 which generally subtends or surrounds the tip 20 to produce a magnetic field which cooperates or interacts with the magnetic field produced by the coil 21 associated with the electrode 19 in order to produce uniform bands 2 of cladding metal overlaying the base metal 1 and integrally bonded thereto.

The apparatus and process for cladding a base metal 1 with overlapping bands 2 of cladding metal hereinbefore described advantageously provides a simple, independently controlled, high power input, heat source, which will allow high welding speeds and which will produce low dilution of the base metal affording the use of a minimal thickness of cladding material which is based primarily on the service requirements and not dictated by the cladding process.

What is claimed is:

1. Apparatus for overlaying a base metal with overlapping bands of cladding material which are integrally bonded thereto, said apparatus comprising an electrode having a non-consumable tip; cooling means and means for generating a magnetic field disposed within said non-consumable tip; means for positioning said electrode with respect to said base metal to produce a gap between the base metal and the tip of the electrode; means for producing an arc between the tip and said base metal to form a molten surface adjacent said tip; means for supplying cladding metal to the vicinity of said arc and said molten surface at a controlled rate; means for providing a blanket of a suitable gas covering said pool and arc; and means for relatively moving said electrode with respect to said metal in such a manner as to produce overlapping bands of cladding metal which overlays the base metal and are integrally bonded thereto.

2. Apparatus as set forth in claim 1, and further comprising means for varying the gap between the base metal and the electrode to maintain a generally constant arc voltage therebetween.

3. Apparatus as set forth in claim 1, wherein the means for supplying cladding material supplies a continuous strip of material and further comprises means for heating the strip of cladding material as the cladding material approaches the base metal.

4. Apparatus as set forth in claim 1, and further comprising means subtending the electrode for producing a magnetic field, said magnetic field producing means cooperating with the first mentioned magnetic field producing means associated with the electrode to produce overlapping uniform bands of cladding material which overlay and are integrally bonded to the base metal.

* * * * *